M. A. BURTHE.
ARTIFICIAL BAIT.
APPLICATION FILED JULY 14, 1909.
941,911.
Patented Nov. 30, 1909.
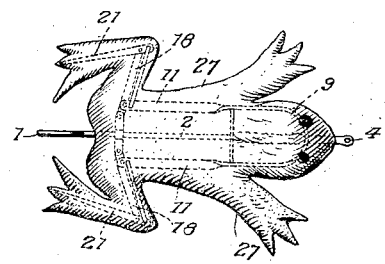
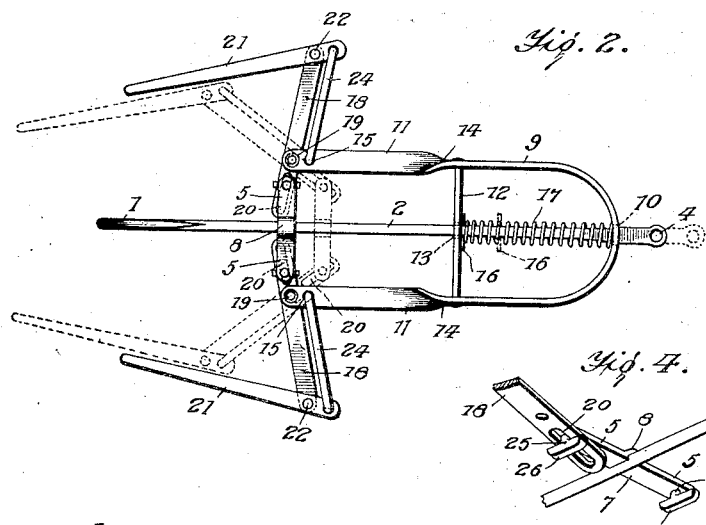
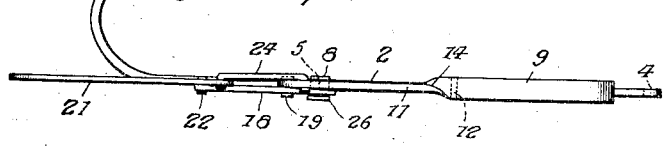
WITNESSES
INVENTOR
MARIE ANDRÉ BURTHE,
BY
ATTORNEYS

UNITED STATES PATENT OFFICE.

MARIE ANDRÉ BURTHE, OF UNIVERSITY, VIRGINIA.

ARTIFICIAL BAIT.

941,911.

Specification of Letters Patent. Patented Nov. 30, 1909.

Application filed July 14, 1909. Serial No. 507,514.

*To all whom it may concern:*

Be it known that I, MARIE ANDRÉ BURTHE, a citizen of the United States, and a resident of University, in the county of Albemarle and State of Virginia, have made certain new and useful Improvements in Artificial Baits, of which the following is a specification.

My invention is an improvement in artificial baits, and consists in certain novel construction and combination of parts hereinafter described and claimed.

The object of the invention is to provide a bait, designed to resemble a small animal, such as a frog, cricket or grasshopper, and so constructed that the resistance of the bait as it is drawn through the water by the line, will cause a movement of portions of the mechanism, resembling the movements of the members of the animal which the bait represents.

Referring to the drawings forming a part hereof, Figure 1 is a plan view of the bait, showing the invention in dotted lines. Fig. 2 is a plan view of the device, the extended position indicated by dotted lines. Fig. 3 is a side elevation, and Fig. 4 is a broken perspective of the shank of the hook, showing more clearly its lugs 5.

The embodiment of the invention shown in the drawings comprises a hook consisting of a hook proper 1, and a shank 2, the hook being provided with the usual barb 3, and the shank with the usual eye 4.

The shank of the hook, near its junction with the hook proper, is provided with oppositely extending lugs 5. The lugs may be integral with the shank; or a plate 7, may be soldered to the shank, and extend on each side thereof to form the lugs, the plate being arched to receive the shank as at 8.

A frame is slidably mounted on the shank between the eye 4 and the lugs, the frame comprising a yoke, whose body portion 9 is provided with an opening 10 through which extends the shank, and arms 11 which extend parallel with the shank.

The yoke is of flat material substantially rectangular in cross section, and at approximately the longitudinal center of the arms, they are connected by a cross bar 12 of similar material having a central opening 13 through which passes the shank.

The arms 11, just beyond the cross bar 12, are given a half turn as at 14, and at their extremities each is provided with two openings 15. A pin 16 traverses the hook, above the cross piece, and a spiral spring 17 encircles the shank above the cross piece, one end thereof bearing against the pin, and the other against the body portion of the yoke.

A lever 18 is pivoted to the end of each arm by means of a pin 19 which passes through one of the openings 15, and a registering opening intermediate the ends of the lever, and much nearer one end than the other, and the short end of the lever is longitudinally slotted as at 20.

An arm 21 is pivoted to the outer or long end of each lever, each of which is provided with an opening for receiving a pin or rivet 22, which traverses the opening and a registering opening in the arm intermediate its ends and close to one of said ends.

The short end of each arm is provided with an opening, and a link 24 connects the said short end with the adjacent arm of the yoke, said link having at each end an angular portion one of which engages the opening of the arm and the other, one of the openings 15 of the yoke arm.

The slot in the short end of the levers is engaged by a lug or stem 25 extending laterally from the adjacent lug 5, and the outer end of the stem is provided with a transverse bar 26, which will engage and pass through the slot 20 of the adjacent lever, and will retain the lever in place when the bar is turned transversely of the lever.

In operation the bait is placed in the water, a line being attached to the eye 5, and the device is drawn through the water. The material of which the yoke is formed, is as before stated, flat, and is arranged with its widest dimension transverse to the shank to form a vane so that when the bait is drawn through the water, or when held stationary in a current, the force of the water tends to move the frame longitudinally of the shank. The spring however acts always to retain the frame in its uppermost position, and the two opposed constant forces, *i. e.*, the spring and the current, will produce an oscillation of the frame with respect to the body. The oscillation of the frame will swing the outer ends of the levers toward and from the hook, and the arms will move longitudinally and also bodily toward and from the hook, the movement resembling the kicking movement of a frog or grasshopper or like animal.

It will be evident that the frame may be covered with any suitable covering to hide the operating mechanism without interfering with the operation of the same, and may be suitably weighted to retain it at the proper depth in the water. A rubber covering is preferable although other coverings answer equally as well.

I claim—

1. A device of the character specified, comprising a shank having at one end a hook and at the other an eye, oppositely extending lugs on each side of the shank intermediate the eye and the hook, a frame slidable longitudinally on the shank, said frame comprising a yoke whose body portion has an opening through which passes the shank and arms extending alongside the shank, said body being arranged with its widest dimensions transverse the shank to form a vane for the purpose specified, a cross bar connecting the arms intermediate their ends, and provided with an opening through which passes the shank, a pin traversing the shank above the cross bar, a spring encircling the shank between the pin and the body of the yoke, a lever pivoted intermediate its ends, and nearer to one end than the other on the end of each arm, the short end of said lever being longitudinally slotted, the adjacent lug on the shank having a pin extending through the slot, an arm pivoted intermediate its ends to the outer end of said lever, a link connecting one end of each arm with the adjacent arm of the yoke, and a covering for the device shaped to simulate the body of an animal.

2. A device of the character specified, comprising a shank having at one end a hook and at the other an eye, oppositely extending lugs on each side of the shank intermediate the eye and the hook, a frame slidable longitudinally on the shank, a spring normally retaining the frame adjacent to the eye, said frame having a vane transverse to the shank for the purpose specified, a lever pivoted intermediate its ends to the frame on each side of the shank, the inner end of the lever being slotted, a pin connected with the shank and engaging the slot, an arm pivoted intermediate its ends to each lever, and a link connecting one end of said lever with the frame.

3. In a device of the character specified, a shank having at one end a hook and at the other an eye, a spring supported frame slidable on the shank the frame being provided with a vane for the purpose specified, a lever pivoted at each side of the frame, a lost motion connection between one end of the lever and the shank, an arm pivoted to the other end of said lever, and a link connecting one end of each lever with the frame.

4. In a device of the character specified, a shank provided with a hook and with means for attaching a line, a spring supported frame slidable on the shank, a lever pivoted intermediate its ends, to each side of the frame, and by one end to the shank, an arm pivoted intermediate its ends to the other end of the lever, and a link connecting one end of each arm with the frame.

5. In a device of the character specified, a shank provided with a hook and with means for attaching a line, a spring supported frame slidable on the shank, a lever on each side of the shank and pivoted by one end thereto, a connection between the frame and the lever for swinging the same when the frame is moved, an arm pivoted to the end of each lever, and means for constraining each arm to move substantially parallel with the frame.

MARIE ANDRÉ BURTHE.

Witnesses:
 FRANK N. LEWIS,
 LUCY WHITE PAGE.